United States Patent
Fukai et al.

(10) Patent No.: US 12,365,026 B2
(45) Date of Patent: Jul. 22, 2025

(54) COMPOSITION FOR USE IN SINTERED MOLDED BODIES, GREEN MOLDED BODY, AND SINTERED MOLDED BODY

(71) Applicants: ASAHI KASEI KABUSHIKI KAISHA, Tokyo (JP); MOULAGE LLC, Tokyo (JP)

(72) Inventors: Motohiro Fukai, Tokyo (JP); Kuon Miyazaki, Tokyo (JP); Yoshimitsu Kankawa, Tokyo (JP)

(73) Assignees: ASAHI KASEI KABUSHIKI KAISHA, Tokyo (JP); MOULAGE LLC, Tokyo (JP)

( * ) Notice: Subject to any disclaimer, the term of this patent is extended or adjusted under 35 U.S.C. 154(b) by 0 days.

(21) Appl. No.: 18/835,017

(22) PCT Filed: Feb. 15, 2023

(86) PCT No.: PCT/JP2023/005333
§ 371 (c)(1),
(2) Date: Aug. 1, 2024

(87) PCT Pub. No.: WO2023/157893
PCT Pub. Date: Aug. 24, 2023

(65) Prior Publication Data
US 2025/0114840 A1    Apr. 10, 2025

(30) Foreign Application Priority Data
Feb. 16, 2022   (JP) ................. 2022-022462

(51) Int. Cl.
B22F 1/102   (2022.01)

(52) U.S. Cl.
CPC .................... B22F 1/102 (2022.01)

(58) Field of Classification Search
CPC ....................................................... B22F 1/102
See application file for complete search history.

(56) References Cited

U.S. PATENT DOCUMENTS

| | | | |
|---|---|---|---|
| 4,721,761 | A | 1/1988 | Omae et al. |
| 5,611,978 | A | 3/1997 | Truebenbach |
| 2009/0030137 | A1 | 1/2009 | Ratnagiri |
| 2013/0133481 | A1 | 5/2013 | Hamakura et al. |
| 2015/0294750 | A1 | 10/2015 | Inagaki et al. |
| 2015/0376397 | A1* | 12/2015 | Hamakura ........ C04B 35/63488 523/455 |
| 2016/0237221 | A1 | 8/2016 | Monma et al. |
| 2018/0265695 | A1 | 9/2018 | Takahashi et al. |
| 2023/0151203 | A1 | 5/2023 | Sunaga |

FOREIGN PATENT DOCUMENTS

| | | |
|---|---|---|
| CN | 103013405 A | 4/2013 |
| CN | 104812835 A | 7/2015 |
| CN | 105555864 A | 5/2016 |
| JP | S61127709 A | 6/1986 |
| JP | H08509196 A | 10/1996 |
| JP | H09111306 A | 4/1997 |
| JP | H10140208 A | 5/1998 |
| JP | 2003192871 A | 7/2003 |
| JP | 2006265659 A | 10/2006 |
| JP | 2011080011 A | 4/2011 |
| JP | 2013112887 A | 6/2013 |
| JP | 2021080350 A | 5/2021 |
| JP | 2021109994 A | 8/2021 |
| TW | 513477 B | 12/2002 |
| TW | 201428049 A | 7/2014 |
| TW | 201716499 A | 5/2017 |
| TW | 202200706 A | 1/2022 |
| WO | 9714524 A1 | 4/1997 |

OTHER PUBLICATIONS

Apr. 18, 2023, Written Opinion of the International Searching Authority issued in the International Patent Application No. PCT/JP2023/005333.
Apr. 18, 2023, International Search Report issued in the International Patent Application No. PCT/JP2023/005333.
Aug. 20, 2024, International Preliminary Report on Patentability issued in the International Patent Application No. PCT/JP2023/005333.
Ji-Zhao Liang, Melt die-swell behavior of polyoxymethylene blended with ethylene-vinyl acetate copolymer and high- density polyethylene, Polymer Testing, 2018, pp. 213-218, vol. 68.
Mar. 18, 2025, the Supplementary European Search Report issued by the European Patent Office in the corresponding European Patent Application No. 23756418.2.

* cited by examiner

*Primary Examiner* — Rebecca Janssen
(74) *Attorney, Agent, or Firm* — KENJA IP LAW PC

(57) ABSTRACT

An object is to provide a composition for use in sintered molded bodies that enables an organic binder to be degreased in a short time without requiring a special facility or step, does not cause mold deposit during molding, and suppresses cracking and swelling during molding and after sintering. In order to achieve the above-mentioned object, the present disclosure is a composition for use in sintered molded bodies containing a sinterable inorganic powder and an organic binder, wherein the organic binder contains at least a polyacetal resin, a polyolefin resin and an epoxy resin, and a total end amount with respect to all polyoxymethylene units in the polyacetal resin is 0.1 mol % or more and 0.75 mol % or less.

12 Claims, No Drawings

COMPOSITION FOR USE IN SINTERED MOLDED BODIES, GREEN MOLDED BODY, AND SINTERED MOLDED BODY

TECHNICAL FIELD

The present disclosure relates to a composition for use in sintered molded bodies, a green molded body, and a sintered molded body.

BACKGROUND

For precise sintered bodies and sintered bodies having complex shapes among sintered bodies produced using sinterable inorganic powders such as those of metals, ceramics, and cermets as materials, a technique using a composition for use in production of sintered molded bodies containing a sinterable inorganic powder and a binder is known. This composition for use in production of sintered molded bodies is heated and kneaded to produce a raw material for sintered molded bodies, which is injection molded to form green molded bodies. Subsequently, the resultant green molded bodies are degreased, followed by sintering.

In the production of sintered molded bodies using the composition for use in production of sintered molded bodies as described above, the most important step for obtaining good quality sintered molded bodies free from defects such as cracks, swells, deformations is the degreasing step. This degreasing step is the step to remove a binder from green molded bodies, which are molded bodies of a composition for use in production of sintered molded bodies. This step employs either the method in which green molded bodies are heated to thermally decompose and gasify the binder, or the method in which green molded bodies are treated with a solvent to elute and remove a soluble binder component in the green molded bodies and then the remaining binder is thermally decomposed and gasified.

However, in the thermal degreasing method as described above where the green molded bodies are degreased by heating, if the binder contained in the green molded bodies thermally decompose and gasify in a short period of time, cracks or swells would occur in the molded bodies during the degreasing step. Degreasing, therefore, must be achieved by heating for a long time.

Therefore, for the purpose of suppressing cracking and swelling of molded bodies during the above-mentioned degreasing step, a technique is known to use a depolymerized polymer as a binder. For example, when a polyacetal resin, which is a depolymerized polymer, is used together with other polymers as a binder, excellent shape retentionability of a green molded body is achieved relying on the rigidity inherent to the polyacetal resin and the shape retentionability of the molded body in the degreasing step by heating can be improved.

As such techniques, for example, PTLs 1 and 2 disclose the techniques in which a polyacetal resin and an epoxy resin are used together as a binder to increase the compatibility of the binder resin components and promote uniformity, thereby improving the qualities of green molded bodies, degreased bodies, and sintered bodies and increasing the degreasing speed. Such researches have been conducted.

CITATION LIST

Patent Literature

PTL 1: JP 2021-109994 A
PTL 2: JP 2021-080350 A

SUMMARY

Technical Problem

In the technique of PTL 1, it is disclosed that usage of resin components including a polyacetal resin and an epoxy resin as an organic binder can suppress deformation and swelling even after degreasing and sintering. However, specific methods to suppress stain of mold (mold deposit) and to improve dimensional accuracy during production of green molded bodies are not disclosed. Therefore, further improvement in these issues has been desired.

Furthermore, the technique of PTL 2 discloses that inclusion of an organic compound with a melting point of 100° C. or lower and a thermoplastic resin with a Vicat softening point of 130° C. or lower as components of the organic binder can reduce the thermal degreasing and sintering time and can provide a sintered bodies free of defects. However, the degreasing step of this organic binder must be performed in superheated steam at a temperature 100° C. or higher and 600° C. or lower, which requires a special facility and makes the production step more complicated than the usual degreasing step performed under an inert gas atmosphere.

Therefore, an object of the present disclosure is to provide a composition for use in sintered molded bodies that enables an organic binder to be degreased in a short time without requiring a special facility or step, does not cause mold deposit during molding, and suppresses cracking and swelling during molding and after sintering, a green molded body, and a sintered molded body.

Solution to Problem

The present inventors have made a series of diligent study to solve the above problem. The present inventors have discovered that the organic binder can be degreased in a short time without requiring a special facility or step, and controls on mold deposit and cracking and swelling of the molded body are enabled by using a polyacetal resin, a polyolefin resin, and an epoxy resin as an organic binder, and optimizing the total end amount with respect to all polyoxymethylene units in the polyacetal resin, to thereby increase the compatibility of the components constituting the organic binder and make the resin components less likely to adhere to a mold during molding.

The present disclosure has been conceived of based on the above finding and the sprit there of is as follows.

[1] A composition for use in sintered molded bodies comprising a sinterable inorganic powder and an organic binder,
wherein the organic binder comprises at least a polyacetal resin, a polyolefin resin, and an epoxy resin, and
a total end amount with respect to all polyoxymethylene units in the polyacetal resin is 0.1 mol % or more and 0.75 mol % or less.

[2] The composition for use in sintered molded bodies according to the above [1], wherein an amount of hemiformal ends with respect to all polyoxymethylene units in the polyacetal resin is 0.05 mol % or more and 0.2 mol % or less.

[3] The composition for use in sintered molded bodies according to the above [1] or [2], wherein the total end amount with respect to all polyoxymethylene units in the polyacetal resin is 0.31 mol % or more and 0.5 mol % or less.

[4] The composition for use in sintered molded bodies according to the above [2], wherein the amount of hemiformal ends with respect to all polyoxymethylene units in the polyacetal resin is 0.14 mol % or more and 0.20 mol % or less.

[5] The composition for use in sintered molded bodies according to any one of the above [1] to [4], wherein a melt flow index of the polyacetal resin is 80 to 200 g/10 min.

[6] The composition for use in sintered molded bodies according to any one of the above [1] to [5], wherein the organic binder contains at least one formaldehyde scavenger.

[7] The composition for use in sintered molded bodies according to any one of the above [1] to [6], wherein the epoxy resin is a copolymer of an olefin and an unsaturated compound having a glycidyl group.

[8] The composition for use in sintered molded bodies according to any one of the above [1] to [7], wherein the unsaturated compound having a glycidyl group in the epoxy resin is 1 to 25 weight % with respect to a total weight of the epoxy resin.

[9] The composition for use in sintered molded bodies according to any one of the above [1] to [8], wherein a melt flow index of the epoxy resin is 3 to 400 g/10 min.

[10] The composition for use in sintered molded bodies according to any one of the above [1] to [9], wherein the organic binder further comprises a compatibilizer.

[11] The composition for use in sintered molded bodies according to any one of the above [1] to [10], wherein a ratio of the organic binder to a total volume of the sinterable inorganic powder and the organic binder is less than 40 volume %.

[12] A green molded body produced by molding the composition for use in sintered molded bodies according to any one of the above [1] to [12].

[13] A sintered molded body produced by sintering the green molded body according to the above [12].

[14] A composition for use in sintered molded bodies comprising a sinterable inorganic powder and an organic binder,
wherein the organic binder comprises at least a polyacetal resin, a polyolefin resin, and an epoxy resin, and
an amount of hemiformal ends with respect to all polyoxymethylene units in the polyacetal resin contained in the composition for use in sintered molded bodies after kneading is 0.14 mol % or more and 0.20 mol % or less Advantageous Effect According to the present disclosure, a composition for use in sintered molded bodies that enables an organic binder to be degreased in a short time without requiring a special facility or step, does not cause mold deposit during molding, and suppresses cracking and swelling during molding and after sintering, a green molded body, and a sintered molded body can be provided.

DETAILED DESCRIPTION

The following provides a detailed description of an embodiment of the present disclosure (hereinafter, referred to as the "present embodiment"). Note that the present embodiment is only representative of the present disclosure, and the present disclosure is not limited to the embodiment thereof. In other words, various changes or modifications may be made without departing from the spirit of the present disclosure.

<Composition for Use in Sintered Molded Bodies>

A composition for use in sintered molded bodies of the present embodiment includes a sinterable inorganic powder and an organic binder. In addition to the inorganic powder and the organic binder, the composition for use in sintered molded bodies of the present embodiment can also contain other additives, as will be described below.

(Sinterable Inorganic Powder)

The composition for use in sintered molded bodies of the present embodiment contains an sinterable inorganic powder.

Note that one of sinterable inorganic powders may be used alone or two or more of these may be used in a combination.

In the present embodiment, the sinterable inorganic powder can be selected from any known suitable sinterable inorganic powders. For example, it may be selected from metal powders, alloy powders, metal carbonyl powders, and mixtures thereof. Among these, metal powders and ceramic powders are particularly preferably used to impart functionality.

Examples of the metal powders include powders of aluminum, magnesium, barium, calcium, cobalt, zinc, copper, nickel, iron, silicon, titanium, tungsten, and metal compounds and metal alloys based on these, for example. Here, not only already prepared alloys but also mixtures of individual alloy components can be used as the metal powders.

Examples of the ceramic powders include oxides such as zinc oxide, aluminum oxide, and zirconia; hydroxides such as hydroxyapatite; carbides such as silicon carbide; nitrides such as silicon nitride and boron nitride; halides such as fluorite; silicates such as stealite; titanates such as barium titanate and lead zirconate titanate; carbonates; phosphates; ferrites; and high-temperature superconductors, for example.

Note that one of the inorganic powders may be used alone, or several inorganic materials such as various metals, metal alloys, or ceramics may be used in combination.

Particularly preferred are titanium alloys and stainless steels as metals and alloy metals, and are $Al_2O_3$ and $ZrO_2$ as ceramics. For example, titanium-6 aluminum-4 vanadium alloy can be preferably used as a titanium alloy, and SUS316L can be preferably used as a stainless steel.

(Organic Binder)

In addition to the sinterable inorganic powder, the composition for use in sintered molded bodies of the present embodiment contains an organic binder.

The organic binder must contain at least a polyacetal resin, a polyolefin resin, and an epoxy resin, and the total end amount with respect to all polyoxymethylene units in the polyacetal resin must be 0.1 mol % or more and 0.75 mol % or less.

The epoxy resin can enhance the compatibility of the polyacetal resin and the polyolefin resin. In addition, when the total end amount with respect to all polyoxymethylene units in the polyacetal resin is within a specific range (0.31 mol % or more and 0.5 mol % or less), the compatibility of the resin components in the organic binder is further improved.

Although the volume ratio of the organic binder in the composition for use in sintered molded bodies of the present embodiment is not particularly limited, it is preferably 25 to 60 volume %, more preferably 30 to 55 volume %, and particularly preferably 35 to 50 volume %, with respect to 100 volume % of the composition for use in sintered molded bodies.

When the organic binder is contained within the above-mentioned range, it is possible to obtain a composition for use in sintered molded bodies with a melt viscosity suitable for injection molding, and to obtain a sintered product with good dimensional accuracy by reducing the shrinkage rate.

Polyacetal Resin

Examples of the polyacetal resin include polyacetal homopolymers, polyacetal copolymers, or mixtures thereof. Among these, polyacetal copolymers are preferably used from the viewpoint of thermal stability.

Note that one of the polyacetal resins may be used alone, or two or more of these may be used in combination.

In addition, the polyacetal may be used in the form of pellets that is normally provided, but may also be used in the form of powder. The particle diameter of the powder is preferably D50=500 μm or less, and more preferably D50=300 μm or less.

Examples of the polyacetal homopolymers include polymers having an oxymethylene unit in the main chain, and both ends of the polymer can be capped by ester or ether groups. The polyacetal homopolymers can be produced from formaldehyde and a known molecular weight modifier used as raw materials, and can be produced from these raw materials using a known onium salt-based polymerization catalyst in a solvent such as a hydrocarbon, by a known slurry method, such as the polymerization methods described in JP S47-6420 B and JP S47-10059 B, for example.

In the polyacetal homopolymer, it is preferable that 99.8 mol % or more of the main chain excluding both ends is composed of an oxymethylene unit, and it is more preferable that the polyacetal homopolymer is a polyacetal homopolymer of which main chain excluding both ends is composed only of an oxymethylene unit.

Examples of polyacetal copolymers include polymers having an oxymethylene unit and an oxyethylene unit in the main chain, and they can be produced through copolymerization of trioxane with a cyclic ether and/or a cyclic formal in the presence of a polymerization catalyst, for example.

The trioxane is a cyclic trimer of formaldehyde, and is typically produced through a reaction of an aqueous solution of formalin in the presence of an acidic catalyst.

The cyclic ether and/or cyclic formal are substances that can be copolymerized with the trioxane, and examples thereof include ethylene oxide, propylene oxide, butylene oxide, epichlorohydrin, epibromohydrin, styrene oxide, oxatane, 1,3-dioxolane, ethylene glycol formal, propylene glycol formal, diethylene glycol formal, triethylene glycol formal, 1,4-butanediol formal, 1,5-pentanediol formal, and 1,6-hexanediol formal. Ethylene oxide and 1,3-dioxolane are particularly preferred. They may be used alone or in a combination of two or more.

Note that examples of the polymerization catalyst used in the production of the polyacetal copolymer include, but are not particularly limited to, boric acid, tin, titanium, phosphorus, arsenic, and antimony compounds typified by Lewis acids. Of these, one or more of boron trifluoride, boron trifluoride-based hydrates, and coordination complexes of boron trifluoride with organic compounds containing oxygen or sulfur atoms are particularly preferred. More specifically, for example, boron trifluoride, boron trifluoride diethyl etherate, and boron trifluoride-di-n-butyl etherate are exemplified as suitable examples. They may be used alone or in a combination of two or more.

In addition, the deactivation of the polymerization catalyst in the production of the polyacetal copolymer is achieved by charging the polyacetal resin obtained through the polymerization reaction into an aqueous solution containing at least one catalyst neutralization deactivator, e.g., amines such as ammonia, triethylamine, or tri-n-butylamine, or a hydroxide of alkali metals or alkaline earth metals, inorganic salts, or organic salts, or an organic solvent solution, and stirring the mixture in the slurry state for several minutes to several hours.

After catalyst neutralization deactivation, the slurry is filtered and washed to remove unreacted monomers, the catalyst neutralization deactivator, and the catalyst neutralization salt, and then dried.

Alternatively, to deactivate the polymerization catalyst, the method in which vapor of ammonia, triethylamine, or the like is brought into contact with the polyacetal copolymer, or the method in which at least one of hindered amines, triphenylphosphine, calcium hydroxide, and the like is brought into contact with the polyacetal resin in a mixing machine may also be used.

Alternatively, without deactivating the polymerization catalyst, an end stabilization process to be described later may also be performed using a polyacetal copolymer in which the amount of the polymerization catalyst is reduced through volatilization by heating at a temperature of the melting point of the polyacetal copolymer or below in an inert gas atmosphere.

Note that the above-described polymerization catalyst deactivation operation and the polymerization catalyst volatilization reduction operation may be performed after pulverizing the polyacetal resin obtained through the polymerization reaction, if necessary.

The end stabilization treatment of the resulting polyacetal resin involves the decomposition and removal of the unstable end portions as follows. For example, a single screw extruder with a vent or a twin screw extruder with a vent is used to melt the polyacetal resin and decompose and remove unstable ends in the presence of a known basic substance that can decompose unstable ends, e.g., ammonia, fatty acid amines such as triethylamine and tributylamine, hydroxides of alkali metals or alkaline earth metals exemplified by calcium hydroxide, inorganic weak acids, and organic weak acids as a cutting agent.

Note that a recycled polyacetal resin may be used as the polyacetal resin. In the material recycling, a polyacetal resin that has been used in a product may be recovered, grease and other impurities, if any, may be removed, and then pulverized to be used as a polyacetal resin. In addition to materially recycled ones, a polyacetal resin that has been used in a product, such as a chemically recycled polyacetal resin, may be recycled into monomers, and a polyacetal resin produced from the monomers may be used.

The recycled polyacetal resin can be used alone or may be mixed with a non-recycled polyacetal resin.

Furthermore, the polyacetal resin may also be a modified polyacetal. In general, a modified polyacetal is a block copolymer having a modified segment in polyacetal. The polyacetal segment may be a homopolymer residue consisting only of an oxymethylene unit or a copolymer residue consisting of an oxymethylene unit and an oxyalkylene unit that are copolymerized randomly. The modified segment is a component that is not classified into polyacetal segments, and examples thereof include polyolefin, polyurethane, polyester, polyamide, polystyrene, and alkyl polyacrylate.

The polyacetal segment is preferably a polyacetal copolymer residue in which an oxymethylene unit and an oxyalkylene unit are randomly copolymerized, and the modified segment is preferably a polyolefin or polyurethane.

The modified segment of the modified polyacetal is preferably a polyolefin from the viewpoint of reducing residues derived from the organic binder in the degreasing step. Specific examples include polyethylene, polypropylene, ethylene-propylene copolymer, ethylene-vinyl acetate copolymer, ethylene-vinyl alcohol copolymer, polyisoprene, polybutadiene, and hydrogenated polybutadiene.

The modified segment of the modified polyacetal is more preferably polyethylene, polypropylene, or hydrogenated polybutadiene from the similar viewpoint, and is particularly preferably hydrogenated polybutadiene from the viewpoint of shape retentionability during the degreasing step and inhibition of cracking and swelling during the degreasing step.

Note that one modified polyacetal resin may be used alone, or two or more modified polyacetal resins may be used, or the modified polyacetal resin may be mixed with an unmodified polyacetal resin.

In addition, in the composition for use in sintered molded bodies of the present embodiment, the total end amount with respect to all polyoxymethylene units in the polyacetal resin must be 0.1 mol % or more. It is considered that interaction points with other resins (polyolefin resins, epoxy resins, etc.) increases as the total end amount with respect to all polyoxymethylene units increases, and that excellent compatibility is achieved particularly when the total end amount is 0.31 mol % or more. From the similar viewpoint, the total end amount with respect to all polyoxymethylene units in the polyacetal resin is preferably 0.1 mol % or more, and more preferably 0.31 mol % or more.

When the total end amount with respect to all polyoxymethylene units in the polyacetal resin is 0.1 mol % or more, compatibility between the epoxy resin and the polyolefin resin tends to be excellent. The higher compatibility of each resin facilitates homogenization and reduces the heterogeneity of resin components, thereby reducing appearance defects such as cracking and swelling of a sintered body caused by these and contributing to improved dimensional accuracy. In addition, the excellent compatibility of the resins also reduces likelihood of adhesion of the resin components to the mold during the molding process, thereby reducing mold deposit. Although this is merely assumption, it is considered that an epoxy resin has strong adhesive strength with metals, and when the epoxy resin is unevenly distributed, adhesion to a mold tends to occur. By increasing the compatibility of resin components, the adhesive strength of the epoxy resin alone can be reduced and adhesion to the mold can be suppressed.

With regard to the total end amount with respect to all polyoxymethylene units in the polyacetal resin, the total end amount with respect to all polyoxymethylene units must be 0.75 mol % or less from the viewpoint of thermal stability, and is preferably 0.5 mol % or less from the similar viewpoint.

Here, the total end amount with respect to all polyoxymethylene units in the polyacetal resin can be measured using an NMR measurement apparatus.

For example, a measurement is carried out at an observation frequency of 900 MHz with an integration count of 128 times at measurement temperature of 25° C., and the total amount (mol %) of acetyl ends, formyl ends, methoxy ends, and hemiformal ends with respect to the main chain —$OCH_2$— structure can be calculated as the total end amount with respect to all polyoxymethylene units.

The amount of hemiformal ends with respect to all polyoxymethylene units in the polyacetal resin processed into feedstock, etc., can be measured, for example, by separating only the polyacetal resin by the following procedure.

First, after the sample is subjected to a freeze pulverization process, HFIP (hexafluoroisopropanol) is added to the resulting pulverized sample to extract the polyacetal resin and other materials.

Furthermore, in order to remove oligomeric components such as polyolefins, the resulting HFIP solution is concentrated, the resultant is re-precipitated by adding chloroform and methanol, filtered, air-dried, and then dried in a vacuum dryer at 50° C. overnight to obtain a polyacetal resin solid.

The resulting polyacetal resin solid is measured by the method described above.

Note that the total end amount with respect to all polyoxymethylene units in the polyacetal resin can be controlled by adjusting the amount of a molecular weight modifier (e.g., methylal, methanol, formic acid, methyl formate, etc.) added during polymerization of the polyacetal resin to thereby adjust the total end amount with respect to all polyoxymethylene units in the polyacetal resin.

Alternatively, the control on the total end amount with respect to all polyoxymethylene units in the polyacetal resin can also be achieved by kneading resins with different total end amounts or by using a polyacetal resin with a branched structure. In this case, polyacetal resins of which molecular chains are cleaved due to thermal aging, etc., such as recycled polyacetal resins, can also be used.

In the composition for use in sintered molded bodies of the present embodiment, the total end amount with respect to all polyoxymethylene units in the polyacetal resin is specified, and the types of ends include acetyl ends, formyl ends, methoxy ends, hemiformal ends, and the like.

Additionally, in the composition for use in sintered molded bodies of the present embodiment, the amount of hemiformal ends with respect to all polyoxymethylene units is preferably 0.05 mol % or more and 0.2 mol % or less, and more preferably 0.14 mol % or more and 0.2 mol % or less. Among the ends present in all polyoxymethylene units, hemiformal ends have particularly strong interaction with other resin components, which can enhance compatibility.

The amount of hemiformal ends with respect to all polyoxymethylene units in the polyacetal resin can be measured in the same way as the end amount as described above.

In cases where the molecular chain of the polyacetal resin is cleaved, the ends of the cleaved parts are converted to hemiformal ends. As means for adjusting the hemiformal ends, the method by mixing an aged polyacetal resin such as thermally decomposed polyacetal resin or recycled polyacetal resin is convenient.

Here, the amount of hemiformal ends with respect to all polyoxymethylene units in the polyacetal resin can be controlled by using a polyacetal resin with a branched structure or by kneading resins with different amounts of hemiformal ends.

Polyolefin Resin

In addition to the polyacetal resin described above, the organic binder further includes a polyolefin resin.

Here, the polyolefin resin is a homopolymer or a copolymer having structural units derived from an alkene having a carbon number of 2 to 8, preferably a carbon number of 2 to 4.

Specific examples of the polyolefin resin include polyethylene, polypropylene, ethylene-propylene copolymer, ethylene-vinyl acetate copolymer, ethylene-vinyl alcohol copolymer, polyisoprene, and polybutadiene. Polyethylene, polypropylene, and mixtures thereof are preferred, and polyethylene or polypropylene is more preferred in terms of shape retentionability in the degreasing step and prevention of cracking and swelling in the degreasing step. Examples of commercially available products that can be suitably used include SUNTEC HD series (manufactured by Asahi Kasei Corporation), SUNTEC LD series (manufactured by Asahi Kasei Corporation), and SUNTEC EVA series (manufactured by Asahi Kasei Corporation), and NEO-ZEX, ULTZEX, and Evolue (above are manufactured by Prime Polymer Co., Ltd.) as polyethylene; and Sumitomo NOBLEN (manufactured by Sumitomo Chemical Co., Ltd.), NOVATEC PP (manufactured by Japan Polypropylene Corporation), SunAllomer PM series (manufactured by SunAllomer Ltd.), and Prime Polypro (manufactured by Prime Polymer Co., Ltd.) as polypropylene, for example.

In addition, the polyolefin resin preferably has a melt flow index of 40 g/10 min or more from the viewpoint of mixability with the sinterable inorganic powder and injection moldability.

Here, the melt flow index of the polyolefin resin can be measured at 190° C., 2.16 kg.

Epoxy Resin

In addition to the polyacetal resin and the polyolefin resin described above, the organic binder further includes an epoxy resin. The inclusion of the epoxy resin enhances compatibility with the polyacetal resin and the polyolefin resin, as well as increasing interaction (adhesion) with the metal powder, thereby improving dispersion and sintering density of the metal powder.

The epoxy resin refers to a resin composed of a group of a plurality of epoxy compounds, and the epoxy compounds refer to compounds having epoxy groups in the molecule thereof. Here, the plurality of epoxy compounds constituting the epoxy resin may have the same or different molecular structures.

In addition, the epoxy resin preferably has a melt flow index of 40 g/10 min or more from the viewpoint of mixability with the sinterable inorganic powder and injection moldability.

Here, the melt flow index of the polyolefin resin can be measured at 190° C., 2.16 kg, according to ASTM-D-1238-57T.

Here, the type of epoxy resin is not particularly limited, but bisphenol A-type epoxy, bisphenol F-type epoxy, novolac-type epoxy, aliphatic epoxy, and epoxy resin with glycidyl, which will be described later, can be used.

A preferred epoxy resin is a copolymer of a glycidyl ester of an unsaturated acid and an olefin, particularly preferably ethylene-glycidyl methacrylate copolymer (EGMA).

Here, the saturated acid glycidyl ester is a compound represented by the general formula (1):

[Chem. 1]

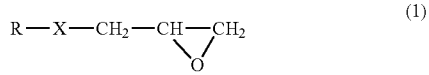

(1)

(in the formula, R represents an alkenyl group having a carbon number of 2 to 18 and X represents a carbonyloxy group), and has an ester structure with an unsaturated acid and an alcohol compound having a glucidyl group. Specific example compounds include glycidyl acrylate, glycidyl methacrylate, glycidyl ethacrylate, and glycidyl itaconate. Among these, glycidyl methacrylate is preferably used.

In addition to the above-mentioned glycidyl ester, the unsaturated acids and/or derivatives thereof, which are optional components, may be unsaturated compounds having one or more carboxylic acid groups, unsaturated compounds having one or more anhydrous carboxylic acid groups, esters of compounds having carboxylic acid groups and alkyl alcohols, etc. Specific example compounds include unsaturated carboxylic acids such as acrylic acid, methacrylic acid, maleic acid, itaconic acid, citraconic acid, and mesaconic acid; unsaturated carboxylic anhydrides such as maleic anhydride; vinyl esters of saturated carboxylic acids such as vinyl acetate, vinyl propionate, and vinyl butyrate; and alkyl esters of unsaturated carboxylic acids such as methyl acrylate, ethyl acrylate, butyl acrylate, methyl methacrylate, ethyl methacrylate, and butyl methacrylate. Among these, vinyl acetate, methyl acrylate, ethyl acrylate, and methyl methacrylate are preferred.

Furthermore, as the olefin copolymerized with the glycidyl ester of the unsaturated acid, α-olefins having a carbon number of 2 to 10 can be exemplified. Among these, ethylene, propylene, and 1-butene are particularly preferred. In addition, the copolymerization method of the glycidyl ester of the unsaturated acid and the olefin is not particularly limited and can be performed by any conventionally well-known method.

Moreover, among the copolymers of the glycidyl ester of the unsaturated acid and the olefin, ethylene-glycidyl methacrylate copolymer (EGMA) is preferred. Commercially available EGMAs can be used. Preferred examples include CELOXIDE manufactured by Daisel Corporation, BONDFAST manufactured by Sumitomo Chemical Co., Ltd., and the like.

Alternatively, the EGMA can be synthesized by various methods. For example, it can be produced by mass polymerization, emulsion polymerization, or solution polymerization with a free radical initiator. Typical polymerization methods are those described in the JP S46-45085 B and JP S61-127709 A, etc., under the presence of a polymerization initiator that generates free radicals, under conditions of a pressure of 500 kg/cm$^2$ or higher and a temperature of 40 to 300° C. In addition, the method of mixing a resin consisting of at least one monomer selected from ethylene and unsaturated olefinic compounds other than ethylene, with an unsaturated epoxy compound and a radical generator, and melt graft copolymerizing the mixture in an extruder, or the method of copolymerizing an unsaturated epoxy compound and an unsaturated olefinic compound in an inert medium such as water or an organic solvent, in the presence of a radical generator is exemplified.

The copolymer of the unsaturated acid glycidyl ester and the olefin resin contains 1 to 25 weight %, preferably 3 to 20 weight %, more preferably 13 to 20 weight % of the unsaturated acid glycidyl ester unit. When the unsaturated acid glycidyl ester unit is 1% or more, interaction with other resin components and the metal powder is increased and dispersibility is increased. In addition, when the unsaturated acid glycidyl ester unit is 25% or less, excellent thermal stability during kneading and injection molding is provided.

The content of unsaturated acid glycidyl ester can be determined by measuring the infrared absorption spectrum of a press sheet of ethylene-based polymer having an epoxy group. The absorbance of characteristic absorption in the infrared absorption spectrum can be corrected by the thickness of the sheet used for measurement, and the content of the unsaturated compound having a glycidyl group can be determined by a calibration curve method based on the corrected absorbance obtained.

Note that the peak of characteristic absorption often appears in the vicinity of 910 cm$^{-1}$, which can be used as an indicator.

When EGMA is used as the epoxy resin, the melt flow index of EGMA is preferably 3 g/10 min or more and 400 g/10 min or less, more preferably 10 g/10 min or more and 400 g/10 min or less, and even more preferably 50 g/10 min or more and 400 g/10 min or less. The melt flow index of EGMA within the above range tends to suppress the separation from other resins that occurs during injection molding and to reduce the time required for degreasing.

Here, the melt flow index of the EGMA can be measured at 190° C., 2.16 kg, according to ASTM-D-1238.

Formaldehyde Scavenger

In addition to the polyacetal resin, the polyolefin resin, and the epoxy resin described above, the organic binder is preferably further contain a formaldehyde scavenger.

The formaldehyde scavenger has the function of trapping or inhibiting the effects of products, such as residual formaldehyde and formic acid produced by denaturation of formaldehyde, which adversely affect productivity and appearance in the production of molded bodies using the polyacetal resin. In the composition containing the polyacetal resin of the present embodiment, the inclusion of a formaldehyde scavenger in the organic binder not only improves the appearance and texture of the molded body due to the formaldehyde capturing function, but also eliminates the reaction points because the formaldehyde scavenger preferentially interacts with the metal powder. This improves the appearance and texture of the molded body more than expected, and also maintains the productivity and improves quality of the product.

Examples of the formaldehyde scavenger include nitrogen-containing compounds, metal salts of inorganic acids, metal oxides, and metal salts of organic acids. Among these, the formaldehyde scavenger is preferably a compound that contains as little acid as possible as an impurity and/or that is less likely to generate acid.

Although only one type of the formaldehyde scavengers agent may be used alone, two or more of these may be used in combination.

Examples of the nitrogen-containing compounds include, for example, polyamide resins, amide compounds, amino-substituted triazine compounds, adducts of amino-substituted triazine compounds and formaldehyde, condensation compounds of amino-substituted triazine compounds and formaldehyde, urea, urea derivatives, hydrazine derivatives, imidazole compounds, and imide compounds.

Examples of the polyamide resins include nylon 4-6, nylon 6, nylon 6-6, nylon 6-10, nylon 6-12, and nylon 12. In addition, the polyamide resin may be a copolymer, such as nylon 6/6-6/6-10 or nylon 6/6-12. Furthermore, examples of the polyamide resin include acrylamide and derivatives thereof, and copolymers of acrylamide and derivatives thereof and other vinyl monomers. For example, poly-β-alanine copolymers obtained by polymerizing acrylamide and a derivative thereof and another vinyl monomer in the presence of a metal alcoholate are exemplified.

Examples of the amide compounds include, for example, polyvalent carboxylic acid amides such as isophthalic diamide, and anthranilamide.

Examples of the amino-substituted triazine compounds include, for example, 2,4-diamidino-sym-triazine, 2,4,6-triamino-sym-triazine, N-butylmelamine, N-phenylmelamine, N,N-diphenylmelamine, N,N-diallylmelamine, benzoguanamine (2,4-diamino-6-phenyl-sym-triazine), acetoguanamine (2,4-diamino-6-methyl-sym-triazine), and 2,4-diamino-6-butyl-sym-triazine.

Examples of the adducts of amino-substituted triazine compounds and formaldehyde include, for example, N-methylolmelamine, N,N'-dimethylolmelamine, and N,N',N''-trimethylol melamine.

Specific examples of the condensates of amino-substituted triazine compounds and formaldehyde include, for example, melamine-formaldehyde condensates.

Examples of the urea derivatives include, for example, N-substituted urea, urea condensates, ethyleneurea, hydantoin compounds, and ureido compounds. Specific examples of N-substituted urea include methyl urea substituted with alkyl groups or other substituents, alkylene bis urea, and aryl substituted urea. Specific examples of urea condensates include condensate of urea and formaldehyde. Examples of hydantoin compounds include hydantoin, 5,5-dimethylhydantoin, and 5,5-diphenylhydantoin. Specific examples of ureido compounds include allantoin and the like.

Examples of the hydrazine derivatives include, for example, hydrazide compounds. Specific examples of hydrazide compounds include dicarboxylic acid dihydrazides, and are specifically exemplified by malonic dihydrazide, succinic dihydrazide, glutaric dihydrazide, adipic dihydrazide, pimelic dihydrazide, suberic dihydrazide, azelaic dihydrazide, sebacic dihydrazide, dodecanedioic dihydrazide, isophthalic dihydrazide, phthalic dihydrazide, and 2,6-naphthalenedicarbohydrazide.

Examples of the imidazole compounds include, for example, imidazole, 1-methylimidazole, 2-methylimidazole, and 1,2-dimethylimidazole.

In addition, examples of the imide compounds include, for example, succinimide, glutarimide, and phthalimide.

Note that formaldehyde scavengers other than those mentioned above include metal salts of inorganic acids, metal oxides, and metal salts of organic acids. For example, hydroxides of sodium, potassium, magnesium, calcium, or barium, carbonates, phosphates, silicates, borates, carboxylates, as well as layered double hydroxides of the above-described metals, are exemplified.

The carboxylic acid of carboxylates is preferably a saturated or unsaturated aliphatic carboxylic acid having a carbon number of 10 to 36, and such a carboxylic acids may be substituted with a hydroxyl group. Specific examples of saturated or unsaturated aliphatic carboxylates include calcium dimyristate, calcium dipalmitate, calcium distearate, calcium (myristate-palmitate), calcium (myristate-stearate), and calcium (palmitate-stearate), and calcium dipalmitate or calcium distearate is preferred.

Examples of the layered double hydroxides include hydrotalcites represented by the following formula (4):

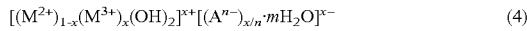

$$[(M^{2+})_{1-x}(M^{3+})_x(OH)_2]^{x+}[(A^{n-})_{x/n} \cdot mH_2O]^{x-} \quad (4)$$

(In formula (4), $M^{2+}$ represents a divalent metal, $M^{3+}$ represents a trivalent metal, and $A^{n-}$ is an n-valent anion (n is an integer greater than or equal to 1), x is in the range of 0<x≤0.33, and m is a positive number).

In formula (4), examples of $M^{2+}$ include $Mg^{2+}$, $Mn^{2+}$, $Fe^{2+}$, $Co^{2+}$, $Ni^{2+}$, $Cu^{2+}$, and $Zn^{2+}$. Examples of $M^{3+}$ include $Al^{3+}$, $Fe^{3+}$, $Cr^{3+}$, $Co^{3+}$, and $In^{3+}$. Examples of $A^{n-}$ include $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ion, and salicylate ion. $OH^-$ and $CO_3^{2-}$ are preferred examples of $A^{n-}$.

Specific examples of hydrotalcites include natural hydrotalcite as indicated by $Mg_{0.75}Al_{0.25}$ $(OH)_2$ $(CO_3)_{0.125} \cdot 0.5H_2O$, and synthetic hydrotalcites as indicated by $Mg_{4.5}Al_2(OH)_{13}CO_3 \cdot 3.5H_2O$, or $Mg_{4.3}Al_2(OH)_{12.6}CO_3$.
(Fluidity Imparting Agent)

In addition to the sinterable inorganic powder and organic binder described above, the composition for use in sintered molded bodies of the present embodiment preferably further contains a fluidity imparting agent. The inclusion of the fluidity imparting agent further improves the fluidity of the composition for use in sintered molded bodies.

The above fluidity imparting agent is a compound other than the polyacetal resins, polyolefin resins, and epoxy resins described above, such as waxes. In this specification, materials with a melting point of 100° C. or lower are referred as "waxes" and materials with a melting point higher than 100° C. are referred to as "resins" so that they are distinguished from each other for convenience.

Examples of the waxes include paraffin wax, polyethylene wax, polypropylene wax, carbana wax, polyethylene glycol, polytetramethylene glycol, polytetraethylene glycol, polyisobutylene, microcrystalline wax, montan-based waxes, beeswax, wood wax, synthetic waxes, poly-1,3-dioxolane, and poly-1,3-dioxepane, for example. Among there, paraffin wax, polyethylene glycol, and polytetramethylene glycol are preferably used from the viewpoint of further improving the fluidity of the composition for use in sintered molded bodies during injection molding.

Compatibilizer

In addition to the sinterable inorganic powder, the organic binder, and the fluidity imparting agent described above, the composition for use in sintered molded bodies of the present embodiment preferably further contains a compatibilizer. The inclusion of the compatibilizer can further improve the quality of the composition for use in sintered molded bodies.

The compatibilizer has properties different from those of the resins and wax described above and has the effect of further increasing the compatibility of the metal with the resins and wax, for example through surfactant-like effects.

Examples of the compatibilizer include SANNIX (Sanyo Chemical Industries, Ltd.), SANFLEX (Sanyo Chemical Industries, Ltd.), TAFMER DF&A (Mitsui Chemicals, Inc.), TAFMER XM (Mitsui Chemicals, Inc.), TAFMER BL (Mitsui Chemicals, Inc.), TAFMER M (Mitsui Chemicals, Inc.), TAFMER PN (Mitsui Chemicals, Inc.), and MARICON (Osaka Gas Chemicals Co., Ltd.).

Note that the composition for use in sintered molded bodies of the present embodiment can be produced by known methods without any particular limitations. For example, the sinterable inorganic powder, the organic binder, and other optional components described above are mixed by, for example, a Henschel mixer, a tumbler, a V-shaped blender, or the like, and then melt-kneaded in a semi-molten state using a single screw extruder or a kneader such as a twin screw extruder, a heating roll, a kneader, and a Banbury mixer. The product can be obtained in various forms, such as strands and pellets.

In the case of kneading using a pressing kneader, the kneading temperature is preferably set from 160° C. to 210° C., more preferably from 170° C. to 190° C. The blade rotation speed is preferably from 10 rpm to 50 rpm, and even more preferably from 15 rpm to 40 rpm. The kneading time is preferably 45 minutes or longer and within 2 hours. By kneading and processing within the above conditions, it is possible to improve the compatibility between the resins and also to suppress the organic binder phenomenon caused by thermal decomposition.

<Green Molded Body>

A green molded body of the present embodiment is made from the composition for use in sintered molded bodies of the present embodiment described above as the raw material.

The resulting green molded body does not have mold deposit, and cracking and swelling are suppressed.

The green molded body of the present embodiment is obtained from the composition for use in sintered molded bodies using a screw-type and piston-type injection molding machine.

In the injection molding, the cylinder temperature is preferably set from 160 to 210° C., more preferably from 170 to 190° C. By setting the temperature to 160° C. or higher, the flowability of the resin can be improved, and by setting the temperature to 200° C. or lower, mold deposit due to resin decomposition can be reduced.

In addition, the mold temperature is preferably from 30 to 90° C., more preferably from 50 to 70° C. Setting the mold temperature 30° C. or higher improves dimensional stability during molding, and setting the mold temperature 90° C. or lower suppresses appearance defects of a green molded body caused by waxes that may have melting points of 100° C. or lower.

<Sintered Molded Body>

A sintered molded body of the present embodiment is obtained by sintering the green molded body of the present embodiment described above.

The resulting sintered molded body does not have mold deposit, and cracking and swelling are suppressed.

A degreased body or a sintered body can be produced by placing a green molded body in a sealed degreasing and sintering furnace and degreasing and sintering it under the desired conditions.

In the case of thermal degreasing, degreasing is achieved by raising the temperature from room temperature to 500° C. to 600° C. under a nitrogen atmosphere. The fluidity imparting agent may be eluted into a solvent prior to heating.

The temperature is then raised to the sintering temperature of the sinterable inorganic powder to obtain a sintered molded body.

In the case of degreasing by an acid, degreasing is achieved by circulating nitric acid gas under a nitrogen atmosphere and raising the temperature from room temperature to 110° C. to 120° C.

The temperature is then raised to the sintering temperature of the sinterable inorganic powder to obtain a sintered molded body.

EXAMPLES

The following provides a description of the present disclosure through specific examples and comparative examples. However, the present disclosure is not limited to the following examples.

(Components of Each Sample)

The components included in each sample in the examples and comparative examples will be described below.

(A) Polyacetal Resin (A-1) Polyacetal Resin

A jacketed twin-shaft paddle type continuous polymerization reactor (manufactured by KURIMOTO, LTD., diameter 2B, L/D=14.8) capable of allowing a heat medium to pass through was set to a temperature of 80° C. A polymerization was caused to take place by continuously feeding, into the polymerization reactor, a catalyst liquid at 69 g/hr which was prepared by diluting boron trifluoride-di-n-butyl etherate as a polymerization catalyst to 0.26 mass % with cyclohexane, trioxane at 3500 g/hr, 1,3-dioxolane at 121 g/hr, and methylal as a molecular weight modifier at 5.41 g/hr.

The product discharged from the polymerization reactor was fed into a 0.5-mass % triethylamine solution to deactivate the polymerization catalyst, which was then filtered, washed, and dried.

Subsequently, the resultant was fed to a twin screw extruder provided with a vent (L/D=40) set to 200° C. In the end stabilization zone, a 0.8-mass % aqueous solution of triethylamine was added in an amount of 20 ppm in terms of the amount of nitrogen, stabilization was carried out while depressurizing and degassing at 90 kPa, and the resultant was pelletized by a pelletizer. Then, the resultant was dried at 100° C. for 2 hours to obtain an (A-1) polyacetal resin.

The resulting (A-1) polyacetal resin had a melting point of 164° C. and a melt flow index of 10 g/10 min.

(A-2) Polyacetal Resin

An (A-2) polyacetal resin was produced in a production method similar to that of the (A-1) polyacetal resin, except that the flow rate of methylal as a molecular weight modifier was set to 5.72 g/hr. The resulting (A-2) polyacetal resin had a melting point of 164° C. and a melt flow index of 20 g/10 min.

(A-3) Polyacetal Resin

An (A-3) polyacetal resin was produced in a production method similar to that of the (A-1) polyacetal resin, except that the flow rate of methylal as a molecular weight modifier was set to 7.1 g/hr. The resulting (A-3) polyacetal resin had a melting point of 164° C. and a melt flow index of 71 g/10 min.

(A-4) Polyacetal Resin

An (A-4) polyacetal resin was produced in a production method similar to that of the (A-1) polyacetal resin, except that the flow rate of methylal as a molecular weight modifier was set to 7.62 g/hr. The resulting (A-4) polyacetal resin had a melting point of 164° C. and a melt flow index of 81 g/10 min.

(A-5) Polyacetal Resin

An (A-5) polyacetal resin was produced in a production method similar to that of the (A-1) polyacetal resin, except that the flow rate of methylal as a molecular weight modifier was set to 9.4 g/hr. The resulting (A-5) polyacetal resin had a melting point of 164° C. and a melt flow index of 121 g/10 min.

(A-6) Polyacetal Resin

An (A-6) polyacetal resin was produced in a production method similar to that of the (A-1) polyacetal resin, except that the flow rate of methylal as a molecular weight modifier was set to 10.6 g/hr. The resulting (A-6) polyacetal resin had a melting point of 164° C. and a melt flow index of 200 g/10 min.

(B) Polyolefin Resin (B-1) Polypropylene: Sumitomo NOBLEN UH501E1 manufactured by Sumitomo Chemical Co., Ltd.

(B-2) Polyethylene: SUNTEC™ LDPE M6555 manufactured by Asahi Kasei Corporation (C) Epoxy Resin (C-1) Aliphatic epoxy: CELOXIDE 2021P manufactured by Daicel Corporation (C-2) EGMA: BODNBAST CG5001 manufactured by Sumitomo Chemical Co., Ltd.

GMA ratio: 19 weight %, melt flow index: 380 g/10 min (C-3) EGMA: BODNBAST BF-30C manufactured by Sumitomo Chemical Co., Ltd.

GMA ratio: 19 weight %, melt flow index: 30 g/10 min (C-4) EGMA: BODNBAST BF-E by Sumitomo Chemical GMA ratio: 12 weight %, melt flow index: 3 g/10 min (C-5) EGMA: BODNBAST BF-2C manufactured by Sumitomo Chemical Co., Ltd.

GMA ratio: 6 weight %, melt flow index: 3 g/10 min (C-6) EGMA: BODNBAST BF-7B manufactured by Sumitomo Chemical Co., Ltd.

GMA ratio: 12 weight %, melt flow index: 7 g/10 min (C-7) EGMA: BODNBAST BF-7M manufactured by Sumitomo Chemical Co., Ltd.

GMA ratio: 6 weight %, melt flow index: 7 g/10 min (D) Fluidity Adding Agent

Paraffin wax: Paraffin wax-145 manufactured by NIPPON SEIRO CO., LTD.

(E) Formaldehyde Scavenger

Sebacic dihydrazide: Manufactured by Japan Finechem Inc.

(F) Compatibilizer (F-1) TAFMER PN-2070 manufactured by Mitsui Chemicals, Inc.

(F-2) SANNIX GL-30000 manufactured by Sanyo Chemical Industries, Ltd.

(F-2) TAFMER XM-7070S manufactured by Mitsui Chemicals, Inc.

(Melt Flow Index)

The melt flow indice of the (A) polyacetal resin, the (B) polyolefin resin, and the (C) epoxy resin were measured under the conditions of 190° C., 2160 g using a MELT INDEXER manufactured by TOYO SEIKIKOGYO CO., LTD., according to ASTM-D-1238.

(Total End Amount with Respect to all Polyoxymethylene Units)

Examples 1 to 19 and Comparative Examples 1 to 5

The total end amount with respect to all polyoxymethylene units of the (A) polyacetal resin was measured using AVANCE III 900 MHz manufactured by Burker and a 5-mm TCI CryoProbe at an observation frequency of 900 MHZ, with an integration count of 128 times, at a measurement temperature of 25° C. The total amount (mol %) of acetyl ends, formyl ends, methoxy ends, and hemiformal ends with respect to the —$OCH_2$— structure of the main chain was calculated.

In addition, the sample to be measured was dissolved in 0.4 wt % TFA-Na/HFIP-d2 solution to a sample concentration of 0.03 wt %, heated and shaken at 40° C. for 2 hours, and poured in a 5 mm φ NMR sample tube (535-PP-7 manufactured by Wilmad, length: 7 inches) without filtration to a liquid height of 40 mm to prepare a sample for the measurement.

The total end amount with respect to all polyoxymethylene units in the resulting polyacetal resin was obtained by mixing the (A-1), (A-2), (A-3), (A-4), (A-5), or (A-6) at 190° C. for 20 minutes in a pressing kneader so that the total end amount was adjusted to the values listed in Tables 1 or 2.

Example 20

In Example 20 only, SUS316L (average particle diameter: 10 μm) was used as the sinterable inorganic powder, and was mixed with each material from (A) to (F) in the blend ratio listed in Table 2, then kneaded in a pressing kneader at a temperature of 175° C. and a blade speed of 30 rpm for 1 hour to prepare each sample of composition for use in sintered molded bodies.

The resulting composition for use in sintered molded bodies was then subjected to a freeze-pulverizing process, and HFIP (hexafluoroisopropanol) was added to the resulting pulverized sample to extract polyacetal resin etc.

Furthermore, in order to remove oligomeric components such as polyolefins, the resulting HFIP solution was concentrated, the resultant was re-precipitated by adding chloroform and methanol, filtered, air-dried, and then dried in a vacuum dryer at 50° C. overnight to obtain a polyacetal resin solid, which was used as a measurement sample.

The total end amount of this polyacetal resin solid was measured using AVANCE III 900 MHz manufactured by Burker and a 5-mm TCI CryoProbe at an observation frequency of 900 MHZ, with an integration count of 128 times, at a measurement temperature of 25° C. The total amount (mol %) of acetyl ends, formyl ends, methoxy ends, and hemiformal ends with respect to the main chain —OCH$_2$— structure was calculated.
(Amount of Hemiformal Ends with Respect to all Polyoxymethylene Units)

Examples 1 to 19 and Comparative Examples 1 to 5

The amount of hemiformal ends with respect to all polyoxymethylene units of the (A) polyacetal resin was measured using AVANCE III 900 MHZ manufactured by Burker and a 5-mm TCI CryoProbe at an observation frequency of 900 MHZ, with an integration count of 128 times, at a measurement temperature of 25° C. The amount (mol %) of hemiformal ends with respect to the main chain —OCH$_2$ structure was calculated.

In addition, the sample to be measured was dissolved in 0.4 wt % TFA-Na/HFIP-d2 solution to a sample concentration of 0.03 wt %, heated and shaken at 40° C. for 2 hours, and poured in a 5 mm φ NMR sample tube (535-PP-7 manufactured by Wilmad, length: 7 inches) without filtration to a liquid height of 40 mm to prepare a sample for the measurement.

The total end amount with respect to all polyoxymethylene units in the resulting polyacetal resin was obtained by mixing the (A-1), (A-2), (A-3), (A-4), (A-5), or (A-6) at 190° C. for 20 minutes in a pressing kneader so that the hemiformal end amount was adjusted to the values listed in Tables 1 or 2.

Example 20

In Example 20 only, SUS316L (average particle diameter: 10 μm) was used as the sinterable inorganic powder, and was mixed with each material from (A) to (F) in the blend ratio listed in Table 2, then kneaded in a pressing kneader at a temperature of 175° C. and a blade speed of 30 rpm for 1 hour to prepare each sample of composition for use in sintered molded bodies.

The resulting composition for use in sintered molded bodies was then subjected to a freeze-pulverizing process, and HFIP (hexafluoroisopropanol) was added to the resulting pulverized sample to extract polyacetal resin etc.

Furthermore, in order to remove oligomeric components such as polyolefins, the HFIP solution was concentrated, the resultant was re-precipitated by adding chloroform and methanol, filtered, air-dried, and then dried in a vacuum dryer at 50° C. overnight to obtain a polyacetal resin solid, which was used as a measurement sample.

The total end amount of this polyacetal resin solid was measured using AVANCE III 900 MHz manufactured by Burker and a 5-mm TCI CryoProbe at an observation frequency of 900 MHZ, with an integration count of 128 times, at a measurement temperature of 25° C. The amount (mol %) of hemiformal ends with respect to the main chain —OCH$_2$— structure was calculated.

Examples 1 to 20 and Comparative Examples 1 to 5

SUS316L (average particle diameter: 10 μm) was used as the sinterable inorganic powder, mixed with each material in the blend ratio listed in Tables 1 and 2, and then kneaded in a pressing kneader at a temperature of 175° C. and a blade speed of 30 rpm for 1 hour to prepare each sample of composition for use in sintered molded bodies.

Then, the raw material for injection molding, which was obtained by cooling and pulverizing each sample of the obtained composition for use in sintered molded bodies, was molded using an injection molding machine (ROBOSHOT α-50iA manufactured by FANUC CORPORATION) at a molding temperature of 175 to 190° C. to produce a plurality of green molded body specimens. Note that the sizes of these green molded body specimens were all 10 mm in width, 60 mm in length, and 3 mm in thickness.

[Evaluations]

The following evaluations (1) to (6) were performed. Evaluation results are summarized in Tables 1 and 2.
(1) Appearance of Green Molded Body Ten green molded body specimens of each sample prepared were randomly sampled and evaluated according to the following criteria by observing their appearance.

O (good): No cracks or breakages were observed

X (poor): Cracks, breakages, etc. were observed
(2) Mold Contamination

For each sample of green molded body specimens, 500 shots of molding were performed, and contamination on the mold was visually observed at the end of 10 shots, 100 shots, and 500 shots.

With regard to mold contaminations, cases with abnormalities on the mold surface, such as when white or iridescent color was observed on the mold or when solids were adhered, were determined to be contaminations, and were evaluated according to the following criteria.

◎: no contamination was observed on the mold by 500 shots

O: no contamination was observed on the mold by 100 shots

X: contamination was observed on the mold by 10 shots
(3) Appearance of Degreased Body Heat degreasing of each sample of the produced green molded body specimens was performed. Each sample of the produced green molded body specimens was set in a degreasing furnace while being supported at two points 50 mm apart.

(3-1) As the first condition, the inside of the degreasing furnace was purged with nitrogen gas and the temperature was increased to 150° C. at 50° C./hr. Thereafter, the temperature was raised from 150 to 200° C. at a heating rate of 30° C./hr and held for 1 hour, then raised from 200 to 400° C. at 30° C./hr, and then raised from 400 to 600° C. at 120° C./hr, and the furnace was then cooled to obtain each sample of the degreased body. (Total time of degreasing step: about 15 hr)

The appearances of 10 of each sample of the obtained degreased bodies were visually observed and evaluated according to the following criteria.

○ (excellent): no abnormality of appearance such as cracking or swelling were observed X (poor): cracks or swelling were observed (3-2) In addition, each sample of the degreased bodies where no abnormal defect such as cracking or swelling was observed, the following second condition was used. The green molded bodies were set in the degreasing furnace while being supported at two points 50 mm apart. Thereafter, the degreasing furnace was purged with nitrogen gas, and the temperature was raised at 50° C./hr to 150° C. Thereafter, the temperature was raised from 150 to 200° C. at a heating rate of 30° C./hr and held for 1 hour, then raised from 200 to 300° C. at 50° C./hr, then raised from 300 to 400° C. at 100° C./hr, and then raised from 400 to 600° C. at 120° C./hr, and the furnace was then cooled to obtain each sample of the degreased body. (Total time of degreasing step: about 12 hr)

The appearances of 10 of each sample of the obtained degreased bodies were visually observed and evaluated according to the following criteria.

○ (excellent): no abnormality of appearance such as cracking or swelling were observed X (Poor): cracks or swelling were observed Note that the samples with ○ (excellent) in the second condition were also rated as ○ (excellent) in the first condition and are omitted from the tables.

(4) Appearance of Sintered Body

Each sample of the obtained degreased bodies was sintered by gradually increasing the temperature from room temperature at 200° C./hr and holding it at the maximum temperature of 1350° C. for 2 hours under an argon atmosphere.

The appearances of 10 of each sample of the degreased bodies were visually observed and evaluated according to the following criteria.

○ (excellent): no abnormality of appearance such as cracking or swelling were observed X (poor): cracks or swelling were observed (5) Density of Sintered Body The densities (g/cm$^3$) of 10 of each sample of the degreased bodies were measured according to JIS Z 8807 using an electronic specific gravity meter (manufactured by Alpha Mirage Co., Ltd.) under a condition of a water temperature of 25° C.

(6) Dimensional Accuracy of Sintered Body

The diameters of 30 of each sample of the degreased bodies were measured with a micrometer. The measured values were then evaluated based on the following evaluation criteria in accordance with the "Permissible Deviations in Widths Without Tolerance" specified in JIS B 0411.

⊚: the grade was fine (tolerance: ±0.05 mm or less)

O: the grade was medium (tolerance exceeded ±0.05 mm but was ±0.1 mm or less)

Δ: the grade was coarse (tolerance exceeded ±0.1 mm but was ±0.2 mm or less)

X: outside the permissible tolerance

TABLE 1

| | | | Comp. Ex.1 | Comp. Ex.2 | Comp. Ex.3 | Comp. Ex.4 | Comp. Ex.5 |
|---|---|---|---|---|---|---|---|
| (A) Polyacetal resin | A-1 | Blending amount in organic binder (vol | 10 | 10 | 60 | — | — |
| | A-2 | Blending amount in organic binder (vol | 10 | — | — | — | — |
| | A-3 | Blending amount in organic binder (vol | 10 | — | — | — | — |
| | A-4 | Blending amount in organic binder (vol | 70 | — | — | — | — |
| | A-5 | Blending amount in organic binder (vol | — | — | — | 100 | 100 |
| | A-6 | Blending amount in organic binder (vol | — | 90 | 40 | — | — |
| (B) Polyolefin resin | B-1 | Blending amount in organic binder (vol | 22.5 | 25 | 25 | 25 | — |
| | B-2 | Blending amount in organic binder (vol | — | — | — | — | — |
| (C) Epoxy resin | C-1 | Blending amount in organic binder (vol | — | — | — | — | — |
| | C-2 | Blending amount in organic binder (vol | — | — | — | — | — |
| | C-3 | Blending amount in organic binder (vol | — | — | — | — | — |
| | C-4 | Blending amount in organic binder (vol | 12.5 | 10 | 10 | — | 10 |
| | C-5 | Blending amount in organic binder (vol | — | — | — | — | — |
| | C-6 | Blending amount in organic binder (vol | — | — | — | — | — |
| | C-7 | Blending amount in organic binder (vol | — | — | — | — | — |
| (D) Fluidity imparting agent | | Blending amount in organic binder (vol | 50 | 40 | 40 | 50 | 40 |
| (E) Formaldehyde scavenger | | Blending amount in organic binder (vol | — | — | — | — | — |

TABLE 1-continued

|  |  |  | Comp. Ex.1 | Comp. Ex.2 | Comp. Ex.3 | Comp. Ex.4 | Comp. Ex.5 |
|---|---|---|---|---|---|---|---|
| (F) Compatibilizer | F-1 | Blending amount in organic binder (vol | — | — | — | — | — |
|  | F-2 | Blending amount in organic binder (vol | — | — | — | — | — |
| Metal powder |  | Blending amount (vol %) of composition for use in production of sintered bodies | 58 | 58 | 58 | 58 | 58 |
| Polyacetal resin |  | Melt flow index | 70 | 120 | 120 | 120 | 120 |
|  |  | Total end amount | 0.05 | 0.8 | 0.05 | 0.36 | 0.36 |
|  |  | OH end amount | 0.02 | 0.15 | 0.15 | 0.14 | 0.14 |
| Evaluation |  | (3) Degreasing conditions | 1st cond. | 1st cond. | 1st cond. | 1st cond. | 1st cond. |
|  |  | (1) Appearance of green molded body | Δ | ◯ | Δ | X | X |
|  |  | (2) Die contamination | X | X | X | X | X |
|  |  | (3-1)(3-2) Appearance of degreased body | ◯ | ◯ | ◯ | X | X |
|  |  | (4) Appearance of sintered body | ◯ | ◯ | ◯ | X | X |
|  |  | (5) Density of sintered body | 90 or less | 91.1 | 90.9 | 90 or less | 90 or less |
|  |  | (6) Dimensional accuracy | X | X | X | X | X |

TABLE 2

|  |  |  | Example 1 | Example 2 | Example 3 | Example 4 | Example 5 | Example 6 | Example 7 | Example 8 |
|---|---|---|---|---|---|---|---|---|---|---|
| (A) Polyacetal resin | A-1 | Blending amount in organic binder (vol | — | — | — | 5 | 20 | — | — | — |
|  | A-2 | Blending amount in organic binder (vol | — | — | — | — | — | — | — | — |
|  | A-3 | Blending amount in organic binder (vol | — | — | — | — | — | — | — | — |
|  | A-4 | Blending amount in organic binder (vol | — | — | 100 | — | 30 | — | — | — |
|  | A-5 | Blending amount in organic binder (vol | 100 | 40 | — | 75 | 10 | 100 | 100 | 100 |
|  | A-6 | Blending amount in organic binder (vol | — | 60 | — | 20 | 40 | — | — | — |
| (B) Polyolefin resin | B-1 | Blending amount in organic binder (vol | 25 | 25 | 25 | 25 | 25 | 25 | 25 | 25 |
|  | B-2 | Blending amount in organic binder (vol | — | — | — | — | — | — | — | — |
| (C) Epoxy resin | C-1 | Blending amount in organic binder (vol | — | — | — | — | — | — | 10 | — |
|  | C-2 | Blending amount in organic binder (vol | 10 | 10 | 10 | 10 | 10 | 10 | — | — |
|  | C-3 | Blending amount in organic binder (vol | — | — | — | — | — | — | — | — |
|  | C-4 | Blending amount in organic binder (vol | — | — | — | — | — | — | — | — |
|  | C-5 | Blending amount in organic binder (vol | — | — | — | — | — | — | — | 10 |
|  | C-6 | Blending amount in organic binder (vol |  |  |  |  |  |  |  |  |
|  | C-7 | Blending amount in organic binder (vol |  |  |  |  |  |  |  |  |
| (D) Fluidity imparting agent |  | Blending amount in organic binder (vol | 40 | 40 | 40 | 40 | 40 | 39.9 | 40 | 40 |
| (E) Formaldehyde scavenger |  | Blending amount in organic binder (vol | — | — | — | — | — | 0.1 | — | — |
| (F) Compatibilizer | F-1 | Blending amount in organic binder (vol |  |  |  |  |  |  |  |  |
|  | F-2 | Blending amount in organic binder (vol |  |  |  |  |  |  |  |  |
|  | F-3 | Blending amount in organic binder (vol |  |  |  |  |  |  |  |  |
| Metal powder |  | Blending amount (vol %) of composition for use in production of sintered bodies | 58 | 58 | 58 | 58 | 58 | 58 | 58 | 58 |

TABLE 2-continued

| | | | | | | | | | |
|---|---|---|---|---|---|---|---|---|---|
| Polyacetal resin | Melt flow index | 120 | 180 | 80 | 120 | 120 | 120 | 120 | 120 |
| | Total end amount | 0.36 | 0.7 | 0.12 | 0.48 | 0.31 | 0.36 | 0.36 | 0.36 |
| | OH end amount | 0.14 | 0.15 | 0.13 | 0.14 | 0.14 | 0.14 | 0.14 | 0.14 |
| Evaluation | (3) Degreasing conditions | 2nd cond. | 1st cond. | 1st cond. | 2nd cond. | 2nd cond. | 2nd cond. | 2nd cond | 1st cond. |
| | (1) Appearance of green molded body | ○ | Δ | ○ | ○ | ○ | ○ | ○ | ○ |
| | (2) Die contamination | ○ | ○ | ○ | ○ | ○ | ◎ | ○ | ○ |
| | (3-1)(3-2) Appearance of degreased body | ○ | ○ | ○ | ○ | ○ | ○ | ○ | ○ |
| | (4) Appearance of sintered body | ○ | ○ | ○ | ○ | ○ | ○ | ○ | ○ |
| | (5) Density of sintered body | 98.7 | 97 | 97 | 98.3 | 98.3 | 98.6 | 97.1 | 97.1 |
| | (6) Dimensional accuracy | ◎ | ○ | Δ | ◎ | ◎ | ◎ | ○ | ○ |

| | | | Example 9 | Example 10 | Example 11 | Example 12 | Example 13 | Example 14 | Example 15 |
|---|---|---|---|---|---|---|---|---|---|
| (A) Polyacetal resin | A-1 | Blending amount in organic binder (vol | — | — | — | — | — | — | — |
| | A-2 | Blending amount in organic binder (vol | — | — | — | — | — | — | — |
| | A-3 | Blending amount in organic binder (vol | — | — | — | — | — | — | — |
| | A-4 | Blending amount in organic binder (vol | — | — | — | — | — | — | — |
| | A-5 | Blending amount in organic binder (vol | 100 | 100 | 100 | 100 | 100 | 100 | 100 |
| | A-6 | Blending amount in organic binder (vol | — | — | — | — | — | — | — |
| (B) Polyolefin resin | B-1 | Blending amount in organic binder (vol | 25 | 25 | — | 25 | 25 | 25 | 25 |
| | B-2 | Blending amount in organic binder (vol | — | — | 25 | — | — | — | — |
| (C) Epoxy resin | C-1 | Blending amount in organic binder (vol | — | — | — | — | — | — | — |
| | C-2 | Blending amount in organic binder (vol | — | — | 10 | 10 | 10 | 5 | 20 |
| | C-3 | Blending amount in organic binder (vol | 10 | — | — | — | — | — | — |
| | C-4 | Blending amount in organic binder (vol | — | 10 | — | — | — | — | — |
| | C-5 | Blending amount in organic binder (vol | — | — | — | — | — | — | — |
| | C-6 | Blending amount in organic binder (vol | | | | | | | |
| | C-7 | Blending amount in organic binder (vol | | | | | | | |
| (D) Fluidity imparting agent | | Blending amount in organic binder (vol | 40 | 40 | 40 | 40 | 40 | 49 | 30 |
| (E) Formaldehyde scavenger | | Blending amount in organic binder (vol | — | — | — | — | — | — | — |
| (F) Compatibilizer | F-1 | Blending amount in organic binder (vol | | | | | | | |
| | F-2 | Blending amount in organic binder (vol | | | | | | | |
| | F-3 | Blending amount in organic binder (vol | | | | | | | |
| Metal powder | | Blending amount (vol %) of composition for use in production of sintered bodies | 58 | 58 | 58 | 61 | 58 | 58 | 58 |
| Polyacetal resin | Melt flow index | | 120 | 120 | 120 | 120 | 120 | 120 | 120 |
| | Total end amount | | 0.36 | 0.36 | 0.36 | 0.36 | 0.36 | 0.36 | 0.36 |
| | OH end amount | | 0.14 | 0.14 | 0.14 | 0.14 | 0.03 | 0.14 | 0.14 |
| Evaluation | (3) Degreasing conditions | | 1st cond. | 1st cond. | 1st cond. | 1st cond. | 1st cond. | 1st cond. | 2nd cond. |
| | (1) Appearance of green molded body | | ○ | ○ | ○ | ○ | ○ | ○ | ○ |
| | (2) Die contamination | | ○ | ○ | ○ | ○ | ○ | ○ | ○ |
| | (3-1)(3-2) Appearance of degreased body | | ○ | ○ | ○ | ○ | ○ | ○ | ○ |
| | (4) Appearance of sintered body | | ○ | ○ | ○ | ○ | ○ | ○ | ○ |

TABLE 2-continued

|  |  |  |  |  |  |  |  |
|---|---|---|---|---|---|---|---|
| (5) Density of sintered body | 97.9 | 97.5 | 96.4 | 97.5 | 96.3 | 98 | 97.6 |
| (6) Dimensional accuracy | Δ | ◯ | ◯ | ◎ | ◯ | ◯ | Δ |

|  |  |  |  | Example 16 | Example 17 | Example 18 | Example 19 | Example 20 |
|---|---|---|---|---|---|---|---|---|
| (A) Polyacetal resin | A-1 | Blending amount in organic binder (vol | — | — | — | — | — |
|  | A-2 | Blending amount in organic binder (vol | — | — | — | — | — |
|  | A-3 | Blending amount in organic binder (vol | — | — | — | — | — |
|  | A-4 | Blending amount in organic binder (vol | — | — | — | — | — |
|  | A-5 | Blending amount in organic binder (vol | 100 | 100 | 100 | 100 | 100 |
|  | A-6 | Blending amount in organic binder (vol | — | — | — | — | — |
| (B) Polyolefin resin | B-1 | Blending amount in organic binder (vol | 25 | 25 | 20 | 20 | 20 |
|  | B-2 | Blending amount in organic binder (vol | — | — | — | — | — |
| (C) Epoxy resin | C-1 | Blending amount in organic binder (vol | — | — | — | — | — |
|  | C-2 | Blending amount in organic binder (vol | — | — | 10 | 10 | — |
|  | C-3 | Blending amount in organic binder (vol | — | — | — | — | — |
|  | C-4 | Blending amount in organic binder (vol | — | — | — | — | — |
|  | C-5 | Blending amount in organic binder (vol | — | — | — | — | — |
|  | C-6 | Blending amount in organic binder (vol | 10 | — | — | — | 10 |
|  | C-7 | Blending amount in organic binder (vol | — | 10 | — | — | — |
| (D) Fluidity imparting agent | | Blending amount in organic binder (vol | 40 | 40 | 40 | 40 | 40 |
| (E) Formaldehyde scavenger | | Blending amount in organic binder (vol | — | — | — | — | — |
| (F) Compatibilizer | F-1 | Blending amount in organic binder (vol | — | — | — | — | 5 |
|  | F-2 | Blending amount in organic binder (vol | — | — | — | 5 | — |
|  | F-3 | Blending amount in organic binder (vol | — | — | 5 | — | — |
| Metal powder | | Blending amount (vol %) of composition for use in production of sintered bodies | 58 | 58 | 58 | 58 | 58 |
| Polyacetal resin | | Melt flow index | 120 | 120 | 120 | 120 | 120 |
|  | | Total end amount | 0.36 | 0.36 | 0.36 | 0.36 | 0.56 |
|  | | OH end amount | 0.14 | 0.14 | 0.14 | 0.14 | 0.18 |
| Evaluation | | (3) Degreasing conditions | 1st cond. | 1st cond. | 2nd cond. | 2nd cond. | 1st cond. |
|  | | (1) Appearance of green molded body | ◯ | ◯ | ◯ | ◯ | ◯ |
|  | | (2) Die contamination | ◯ | ◯ | ◯ | ◯ | ◯ |
|  | | (3-1)(3-2) Appearance of degreased body | ◯ | ◯ | ◯ | ◯ | ◯ |
|  | | (4) Appearance of sintered body | ◯ | ◯ | ◯ | ◯ | ◯ |
|  | | (5) Density of sintered body | 97.5 | 97.3 | 98.9 | 98.8 | 97.9 |
|  | | (6) Dimensional accuracy | ◯ | ◯ | ◎ | ◎ | ◎ |

From the results in Tables 1 and 2, it can be seen that Examples 1 to 20 had well-balanced and excellent results in all evaluation items. On the other hand, Comparative Examples 1 to 5 had inferior results to those of the examples in at least one of the evaluation items. In particular, both of mold deposit and dimensional accuracy of the sintered products were inferior to those of the examples.

INDUSTRIAL APPLICABILITY

According to the present disclosure, a composition for use in sintered molded bodies that enables an organic binder to be degreased in a short time without requiring a special facility or step, does not cause mold deposit during molding, and suppresses cracking and swelling during molding and after sintering, a green molded body, and a sintered molded body can be provided.

The invention claimed is:

1. A composition for use in sintered molded bodies comprising a sinterable inorganic powder and an organic binder,
wherein the organic binder comprises at least a polyacetal resin, a polyolefin resin, and an epoxy resin, and
a total end amount with respect to all polyoxymethylene units in the polyacetal resin is 0.1 mol % or more and 0.75 mol % or less.

2. The composition for use in sintered molded bodies according to claim 1, wherein an amount of hemiformal ends with respect to all polyoxymethylene units in the polyacetal resin is 0.05 mol % or more and 0.20 mol % or less.

3. The composition for use in sintered molded bodies according to claim 1, wherein the total end amount with respect to all polyoxymethylene units in the polyacetal resin is 0.31 mol % or more and 0.50 mol % or less.

4. The composition for use in sintered molded bodies according to claim 2, wherein the amount of hemiformal ends with respect to all polyoxymethylene units in the polyacetal resin is 0.14 mol % or more and 0.20 mol % or less.

5. The composition for use in sintered molded bodies according to claim 1, wherein a melt flow index of the polyacetal resin is 80 to 200 g/10 min.

6. The composition for use in sintered molded bodies according to claim 1, wherein the organic binder contains at least one formaldehyde scavenger.

7. The composition for use in sintered molded bodies according to claim 1, wherein the epoxy resin is a copolymer of an olefin and an unsaturated compound having a glycidyl group.

8. The composition for use in sintered molded bodies according to claim 1, wherein the unsaturated compound having a glycidyl group in the epoxy resin is 1 to 25 weight % with respect to a total weight of the epoxy resin.

9. The composition for use in sintered molded bodies according to claim 1, wherein a melt flow index of the epoxy resin is 3 to 400 g/10 min.

10. The composition for use in sintered molded bodies according to claim 1, further comprising a compatibilizer.

11. The composition for use in sintered molded bodies according to claim 1, wherein a ratio of the organic binder to a total volume of the sinterable inorganic powder and the organic binder is less than 40 volume %.

12. A composition for use in sintered molded bodies comprising a sinterable inorganic powder and an organic binder,
wherein the organic binder comprises at least a polyacetal resin, a polyolefin resin, and an epoxy resin, and
an amount of hemiformal ends with respect to all polyoxymethylene units in the polyacetal resin contained in the composition for use in sintered molded bodies after kneading is 0.14 mol % or more and 0.20 mol % or less.

* * * * *